Nov. 30, 1937.   B. M. LEECE   2,100,905
GENERATOR REGULATION
Filed April 24, 1936

INVENTOR.
BENNETT M. LEECE
BY
*Kwis, Hudson & Kent*
ATTORNEYS.

Patented Nov. 30, 1937

2,100,905

UNITED STATES PATENT OFFICE 2,100,905

GENERATOR REGULATION

Bennett M. Leece, Shaker Heights, Ohio, assignor to The Leece-Neville Company, Cleveland, Ohio, a corporation of Ohio Application April 24, 1936, Serial No. 76,103

9 Claims. (Cl. 171—223)

This invention relates to the regulation of electrical generators, and more particularly to improved means for regulating the terminal voltage of a generator.

An object of my invention is to provide improved generator regulating means which is adapted for more or less universal application to different types or makes of generators and which affords a sufficiently wide range of regulation to cooperate efficiently with any one of the different types or makes of generators to which it may be applied.

Another object of this invention is to provide an improved regulator of the electromagnetic vibratory type having a novel circuit arrangement affording effective regulation of the generator to which it may be applied with minimum sparking and wear at the contacts.

Still another object of my invention is to provide improved generator regulating means having cooperating contacts adapted to be vibrated by a magnet, and wherein closing of the contacts affords full field excitation for the generator and opening of the contacts causes energization of a reverse polarity field winding and also reduces the effectiveness of the magnet.

A further object of my invention is to provide improved generator regulating means, of the type mentioned, wherein the opening of the contacts of the vibratory device causes a reverse polarity field winding and an opposing magnet coil of the vibratory device to be energized in series circuit with a normal polarity field winding of the generator.

Yet another object of my invention is to provide improved generator regulating means, of the type mentioned, wherein the vibratory device has a second pair of contacts, the closing of which causes the normal polarity field winding of the generator to be deenergized and also causes the reverse polarity field winding and the opposing magnet coil of the vibratory device to be connected in series with each other as a shunt across terminals of the generator.

Figure 1:
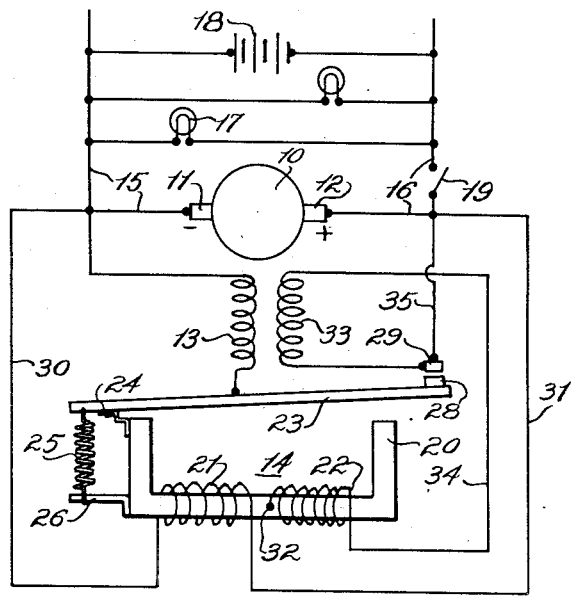
Figure 2:
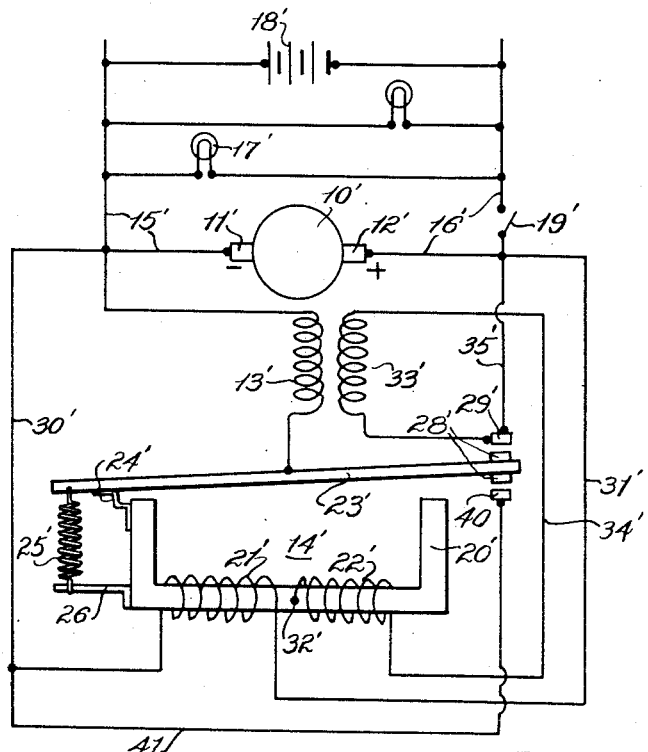

Other objects and advantages of the invention will be apparent from the following description when taken in conjunction with the accompanying sheet of drawing, wherein Fig. 1 is a wiring diagram illustrating improved generator regulating means embodying my invention, and Fig. 2 is a wiring diagram showing another regulating arrangement embodying my invention.

More detailed reference will presently be made to the accompanying drawing which discloses what I now regard to be preferred forms of my improved generator regulating apparatus. My novel regulating arrangement may be used in connection with various types of electrical generators, but is especially useful for application to the generators of battery charging and lighting systems of motor vehicles. Before proceeding with such more detailed explanation it should be understood that the invention may be embodied in various other regulating devices and arrangements than the specific forms herein disclosed.

In Fig. 1 of the drawing I show my novel regulating means applied to an electrical system which includes a generator 10 having brushes 11 and 12 and a normal polarity shunt field winding 13. This novel arrangement also includes a regulator 14 of the electromagnetic vibratory type which is operatively connected with the generator and which may be constructed as a self-contained unit, as will be presently explained.

The generator 10, may be driven by an internal combustion engine or other power means and may be operated to supply current for any desired purpose, for example, it may supply current through load conductors 15 and 16 for operating incandescent electric lamps 17 or for charging the storage battery 18. The load circuit of the generator may be controlled by any suitable means, such as a reverse current cutout or a manually operable switch 19.

The vibratory regulator 14 comprises a magnet frame 20 having energizing coils 21 and 22 thereon. The regulator also includes an armature 23 which may be movably mounted on the frame and electrically connected therewith by the flexible element 24. A tension spring 25 has one end thereof connected to the armature and its other end anchored as by connection with a bracket 26 of the frame. The armature 23 is adapted to be rapidly vibrated in response to the combined action of the spring 25 and fluctuations occurring in the magnetization of the frame 20.

The armature 23 of the regulator carries a contact 28 which is electrically connected with the armature and, through the element 24, with the magnet frame 20. The contact 28 is normally urged or biased by the spring 25 toward engagement with a suitably supported stationary contact 29 and is adapted to be separated from the latter contact when the armature is shifted in opposition to the spring by the magnetization of the frame.

The coil 21 of the vibratory regulator is a voltage or operating coil which may be connected across terminals of the generator by the conductors 30 and 31 which connect the ends of this coil with the brushes 11 and 12. The coil 22 is an auxiliary or secondary coil which is wound to magnetically oppose the operating coil 21. One end of the coil 22 is connected with the movable contact 28 by being grounded on the magnet frame 20 as indicated at 32. The other end of this coil is connected with the stationary contact 29 through a reverse polarity auxiliary field winding 33 and the conductor 34. It will be understood, of course, that the coils 21 and 22 of the regulator magnet will have suitable resistance and ampere-turn values for efficient operation of the regulator in the class of service to which it is to be applied.

I have already explained that one end of the shunt field winding 13 is connected with the generator brush 11, and it should now be explained that the other or outer end of this field winding is connected with the armature 23, and hence, with the movable contact 28 of the regulator. It will also be noted that the stationary contact 29 is connected with the generator brush 12 by means of the conductor 35 and the load conductor 16. The auxiliary or reverse polarity field winding 33 may be associated in any suitable way with the normal polarity shunt field winding 13, for example, it may be wound on one of the magnet poles of the generator or may be wound with a portion thereof on each of the magnet poles.

To explain the operation of my improved regulating arrangement, let it be assumed that the generator 10 is being started from rest. At the time of starting of the generator the contacts 28 and 29 are held closed by the spring 25, and so long as these contacts remain closed the normal polarity field winding 13 is connected directly across the brushes 11 and 12 of the generator and provide substantially full field excitation. During the time that the contacts 28 and 29 remain closed the reverse polarity field winding 33 and the opposing magnet coil 22 are substantially deenergized because they are both at this time connected to the same brush, namely, brush 12 of the generator and are in a closed series loop with each other.

As the speed of the generator builds up, the regulator frame 20 becomes magnetized because of energization of the coil 21 from the generator. When this magnetization is sufficient to overcome the action of the spring 25, the contacts 28 and 29 are opened. The opening of these contacts changes the circuit connections, so that the reverse polarity winding 33 and the opposing magnet coil 22 are connected in series with the normal polarity field winding 13. The energizing circuit thus established for the field windings and the magnet coil 22 may be traced as follows: From brush 11, through the normal polarity field winding 13 to the magnet frame 20, then through magnet coil 22, conductors 34 and reverse polarity field winding 33 to stationary contact 29, and then back to generator brush 12 through conductors 35 and 16. Since the winding 33 magnetically opposes the field winding 13, and the magnet coil 22 magnetically opposes the magnet coil 21, it will be seen that the opening of the contacts 28 and 29 will cause a sudden decrease in the field flux of the generator, and will also cause a sudden decrease in the flux of the regulator magnet. The effect of this is to prevent further increase of the terminal voltage of the generator and to permit the contacts 28 and 29 to be closed by the spring 25. The change from one to the other of the field energizing circuits just explained takes place very rapidly and provides a very efficient regulating action, whereby the terminal voltage of the generator is maintained substantially constant, irrespective of changes in load or speed. Furthermore, the effective demagnetizing action of the "bucking" field winding 33 and the "bucking" magnet coil 22 tends to produce an extremely rapid vibratory action of the armature 23 which is very desirable for the attainment of efficient regulation with minimum sparking and wear at the contacts 28 and 29.

In Fig. 2 of the drawing I have shown a regulating arrangement which is generally similar to that of Fig. 1, but in which the vibratory regulator is of the double contact type and is capable of providing a wider and more effective regulating range. To avoid repetition in describing the construction and circuits involved in the arrangement of Fig. 2, I have applied primed reference characters to the latter to designate the parts thereof which correspond with similar parts of Fig. 1.

In the improved regulating arrangement of Fig. 2 the movable contact 28' cooperates with a pair of spaced stationary contacts 29' and 40, instead of with a single stationary contact, as in Fig. 1. The additional stationary contact 40 is connected with the brush 11' of the generator by conductors 41, 30' and 15'.

When the movable contact 28 is being rapidly vibrated to engage and disengage the stationary contact 29', the resulting regulating action and the circuits established are identical with those explained above in detail in connection with Fig. 1. However, when more effective regulating action is required, such as when the speed or load conditions of the generator vary widely, the magnetization of the frame 20' increases and causes the movable contact 28' to engage the stationary contact 40. When this occurs the normal polarity field winding 13' is substantially deenergized because both of its ends are then connected to the same generator brush, namely the brush 11'.

The engagement of the contact 28' with the contact 40 also causes the reverse polarity field winding 33' and the opposing magnet coil 22' to be connected in series with each other and in a shunt circuit across the brushes 11' and 12' of the generator. This latter circuit may be traced as follows: From brush 11' through conductors 15', 30' and 41 to stationary contact 40, then through the frame 20' of the regulator, through coil 22', conductor 34', reverse polarity field winding 33' to stationary contact 29' and then to generator brush 12' through conductors 35' and 16'.

In the operation of this more effective regulating arrangement of Fig. 2, as just explained, it will be noted that the double contact arrangement provides for three different regulating conditions. The first occurs when the contacts 28' and 29' are closed, at which time the normal polarity winding 13' provides full field excitation and the reverse polarity winding 33' and the opposing coil 22' are deenergized. The second condition occurs when the contacts 28' and 29' open, at which time the winding 33' and the coil 22' are connected in series with the normal polarity field winding 13'. The third condition occurs when the contact 28' engages the contact 40, at which time the outer and inner ends of the normal polarity field winding 13' are connected to the same side of the generator and the reverse polarity winding 33' and the opposing coil 22' are connected in series with each other as a shunt across the generator terminals. It will be understood, of course, that the change from one of these conditions to the other may take place very rapidly, resulting in the movable contact 28 operating at times on the contact 29' and at times on the contact 40, and possibly at other times alternately between the contacts 29' and 40.

From the foregoing description and the accompanying drawing it will now be readily seen that I have provided a novel regulating arrangement for electrical generators which is very efficient in operation, and which has a sufficiently wide regulating range to render the same more or less universally applicable to a variety of makes and types of generators, such as might be encountered in the automotive field.

While I have illustrated and described the improved regulating means of my invention in a somewhat detailed manner, it should be understood that I do not wish to be limited to the precise arrangements illustrated and described, but regard my invention as including such changes and modifications as do not constitute a departure from the spirit of the invention and the scope of the appended claims.

Having thus described my invention I claim:

1. In combination a generator having a shunt field winding of normal polarity, a regulator having magnet coils energized from the generator and cooperating contacts adapted to be opened and closed, a field winding of reverse polarity adapted when energized to magnetically oppose the normal polarity field winding of the generator, and means connecting said reverse polarity field winding and one of the magnet coils in series with each other across said contacts.

2. In combination a generator having a shunt field winding of normal polarity, a regulator having magnet coils energized from the generator and cooperating contacts adapted to be opened and closed, said coils including a voltage coil and a coil wound to oppose the voltage coil, a field winding of reverse polarity which when energized magnetically opposes the normal polarity field winding of the generator, and means connecting said reverse polarity field winding and the opposing magnet coil in series with each other across said contacts.

3. In combination a generator having a shunt field winding of normal polarity and a field winding of reverse polarity, a regulator comprising a magnet having energizing coils and a vibratory member adapted to be operated by the magnet, one of said coils being an operating coil energized from the generator and another being a coil wound so that when energized it magnetically opposes the operating coil, a pair of contacts adapted to be opened and closed by the operation of said vibratory member, and circuit connections providing for full excitation of the normal polarity field winding when the contacts are closed and for energization of said reverse polarity field winding and said opposing magnet coil in series with the normal polarity field winding when the contacts are open.

4. In combination a generator having a shunt field winding of normal polarity and a field winding of reverse polarity, a regulator comprising a magnet having energizing coils and a vibratory member adapted to be operated by the magnet, one of said coils being an operating coil energized from the generator and another being a coil wound so that when energized it magnetically opposes the operating coil, a pair of contacts adapted to be opened and closed by the operation of said vibratory member, circuit connections established by the closing of said contacts for connecting said opposing magnet coil and said reverse polarity winding in a closed series loop with each other and providing for full excitation for the normal polarity field winding, and circuit connections established by the opening of said contacts for energizing said reverse polarity field winding and said opposing magnet coil in series with the normal polarity field winding.

5. In combination a generator having a shunt field winding of normal polarity and a field winding of reverse polarity adapted to magnetically oppose the normal polarity field winding, a regulator comprising a magnet having a pair of energizing coils and a vibratory member adapted to be operated by variations in the magnetization produced by said coils, one of said coils being a voltage coil energized from the generator and the other being a coil wound to magnetically oppose the voltage coil, a pair of contacts adapted to be opened and closed by the operation of the vibratory member, and means connecting said reverse polarity winding and said opposing magnet coil in series with each other and in a shunt across said contacts.

6. In combination a generator having a shunt field winding of normal polarity and a field winding of reverse polarity, a regulator comprising a magnet having energizing coils and a vibratory member adapted to be operated by the magnet, one of said coils being an operating coil energized from the generator and another being a coil wound to magnetically oppose the operating coil, a plurality of pairs of contacts adapted to be opened and closed by the operation of the vibratory member, circuit connections controlled by one pair of contacts providing for full excitation of the normal polarity field winding when said one pair of contacts is closed and for energization of said reverse polarity field winding and said opposing magnet coil in series with the normal polarity field winding when said one pair of contacts is open, and circuit connections controlled by the other pair of contacts for deenergizing the normal polarity field winding and for connecting said reverse polarity field winding and said opposing magnet coil in series with each across the terminals of the generator when said second pair of contacts is closed.

7. In combination a generator having a shunt field winding of normal polarity and a field winding of reverse polarity, a regulator comprising a magnet having a pair of energizing coils and a vibratory member adapted to be operated by the magnet, one of said coils being a voltage coil energized from the generator and the other being a coil wound to magnetically oppose the voltage coil, a plurality of pairs of contacts adapted to be opened and closed by the operation of the vibratory member, circuit connections controlled by one pair of contacts providing for full excitation of the normal polarity field winding when said one pair of contacts is closed and for energization of said reverse polarity field winding and said opposing magnet coil in series with the normal polarity field winding when said one pair of contacts is open, and circuit connections controlled by the other pair of contacts for deenergizing the normal polarity field winding and for connecting said reverse polarity field winding and said opposing magnet coil in series with each across the terminals of the generator when said second pair of contacts is closed.

8. In combination a generator having brushes and normal and reverse polarity field windings, a regulator comprising a magnet having energizing coils and a vibratory member adapted to be operated by the magnet, a pair of cooperating contacts one of which is stationary and the other of which is actuated by said vibratory member, said normal polarity field winding having one end connected with one of said brushes and its other end connected with the movable contact, one of said magnet coils being an operating coil connected across the generator brushes and another being a coil magnetically opposing the operating coil and having one end connected with said movable contact and its other end connected with the stationary contact through said reverse polarity field winding, and means connecting said stationary contact with another of the generator brushes.

9. In combination a generator having brushes and normal and reverse polarity field windings, a regulator comprising a magnet having energizing coils and a vibratory member adapted to be actuated by the magnet, a pair of stationary contacts, a contact adapted to be moved by said vibratory member to engage one or the other of the stationary contacts, said normal polarity field winding having one end thereof connected with one of said brushes and its other end connected with the movable contact, one of said magnet coils being an operating coil connected across the generator brushes and another being a coil magnetically opposing the operating coil and having one end connected with said movable contact and its other end connected with one of the stationary contacts through said reverse polarity field winding, means connecting the other stationary contact with said one generator brush, and means connecting said one stationary contact with another of the generator brushes.

BENNETT M. LEECE.